(12) United States Patent
Keller

(10) Patent No.: US 9,585,372 B2
(45) Date of Patent: Mar. 7, 2017

(54) WATER INLET SYSTEM FOR AN AQUARIUM, A SIPHON STOPPER AND A METHOD OF ATTACHING THE SYSTEM TO AN AQUARIUM

(71) Applicant: Adam John Keller, Fremont, WI (US)

(72) Inventor: Adam John Keller, Fremont, WI (US)

( * ) Notice: Subject to any disclaimer, the term of this patent is extended or adjusted under 35 U.S.C. 154(b) by 181 days.

(21) Appl. No.: 14/615,854

(22) Filed: Feb. 6, 2015

(65) Prior Publication Data

US 2016/0227747 A1 Aug. 11, 2016

(51) Int. Cl.
*A01K 63/04* (2006.01)
*A01K 63/00* (2006.01)

(52) U.S. Cl.
CPC ........... *A01K 63/006* (2013.01); *A01K 63/04* (2013.01); *A01K 63/045* (2013.01)

(58) Field of Classification Search
CPC .............................. A01K 63/04; A01K 63/045
USPC ... 119/247, 259, 260, 261, 262; 210/167.21, 210/167.27, 416.2; 137/140
See application file for complete search history.

(56) References Cited

U.S. PATENT DOCUMENTS

| | | | |
|---|---|---|---|
| 5,098,585 A * | 3/1992 | Woltman | A01K 63/045 119/259 |
| 5,603,831 A * | 2/1997 | Hickok | A01K 63/047 119/260 |
| 5,605,115 A * | 2/1997 | Dale | A01K 63/003 119/249 |
| 5,626,747 A | 5/1997 | Ritzow et al. | |
| 6,056,886 A | 5/2000 | Hickok, Jr. et al. | |
| 6,770,194 B1 | 8/2004 | McGrath | |
| 7,022,227 B1 * | 4/2006 | Liao | A01K 63/045 119/263 |
| 7,241,379 B2 * | 7/2007 | Agresta | A01K 63/045 119/259 |
| 7,618,534 B2 | 11/2009 | Mihlbauer et al. | |
| 8,034,237 B2 | 10/2011 | Happel et al. | |
| 8,132,534 B2 | 3/2012 | Arita et al. | |
| 2006/0273037 A1 * | 12/2006 | Venezia | A01K 63/045 210/703 |
| 2009/0134532 A1 * | 5/2009 | Tsai | A01K 63/042 261/28 |
| 2009/0250121 A1 | 10/2009 | Kirkman | |

* cited by examiner

*Primary Examiner* — David Parsley
(74) *Attorney, Agent, or Firm* — Thomas J. Connelly; Northwind IP Law, S.C.

(57) ABSTRACT

A water inlet system for an aquarium is disclosed along with a siphon stopper and a method of attaching the system to an aquarium. The water inlet system is designed to pass through an aperture formed in a sidewall of the aquarium. A tubular member is connected to a pump which can supply water from a reservoir to the aquarium. The tubular member passes through the aperture and into the aquarium. An adapter having a spout is connected to one end of the tubular member. In addition, a siphon stopper is secured to the adapter, above the spout, and serves to break any back siphon that may develop should the water line in the aquarium drop below a predetermined point. The method includes the steps of attaching the water inlet system to the aquarium.

20 Claims, 3 Drawing Sheets

WATER INLET SYSTEM FOR AN AQUARIUM, A SIPHON STOPPER AND A METHOD OF ATTACHING THE SYSTEM TO AN AQUARIUM

FIELD OF THE INVENTION

This invention relates to a water inlet system for an aquarium, a siphon stopper and a method of attaching the system to an aquarium.

BACKGROUND OF THE INVENTION

Aquariums are water filled enclosures in which living fish and/or other aquatic animals and plants are kept. The water in an aquarium needs to be filtered on a regular basis. The clean, filtered water is then pumped back into the aquarium via a water inlet system. The pump operates on electricity and is subject to power outages which can occur fairly frequently. The pump is also a mechanical piece of equipment which is prone to failure at some point. Either of these events would cause the pump to stop working and this would disrupt the return water flowing back into the aquarium. Sometimes, a back siphon occurs when the pump stops working. A back siphon allows the water in the aquarium to flow backward into the reservoir tank of the filtering system. This extra water can quickly overflow the reservoir tank and create a flood. Since many aquariums are set up in a home or in the lobby area of an office, the aquariums are normally residing in a carpeted room with fine furniture located nearby. The filtering system is usually situated in a cabinet below the aquarium. Any water that overflows the reservoir tank will flow downward onto the carpeting. This water will wet the carpeting and possibly leave a water stain or worst, ruin the carpeting. Furthermore, if the overflowed water becomes deep enough, it could possibly soak and/or stained adjacent furniture.

To prevent a flood from occurring, most aquariums employ a water inlet system which includes a one-way check valve positioned in the incoming water line. However, many one-way check valves utilize a gasket or seal, a spring, and a ball that mates with a concave surface. Over time, the gasket or seal can become brittle, hard or worn and will not function properly. In addition, rust, corrosion, or oxidation can cause the spring to malfunction or cause the ball to become pitted such that it does not form a tight seal with the concave surface. Also, the presence of a foreign particle on the concave surface could prevent the one-way check valve from working properly. Therefore, there is a need for a water inlet system that does not rely on a one-way check valve to prevent a back siphon from occurring should the pump stop working.

Now, a water inlet system for an aquarium, a siphon stopper and a method of attaching the system to an aquarium have been invented which does not utilize a one-way check valve.

SUMMARY OF THE INVENTION

Briefly, this invention relates to a water inlet system for an aquarium, a siphon stopper and a method of attaching the system to an aquarium. The aquarium has a sidewall and a water line. The water inlet system includes an aperture formed through the sidewall of the aquarium. A tubular member passes through the aperture. The tubular member has a first end connected to a pump which can supply water from a reservoir to the aquarium. The tubular member also has a second end positioned in the aquarium. An adapter having a first end is secured to the second end of the tubular member. The adapter also has an open second end and an open third end. The open third end is positioned below the open second end. The water inlet system also includes a spout having a first end secured to the open third end of the adapter and a second end through which water can be discharged into the aquarium. The spout is maneuverable to alter the direction, angle and location of the discharged water. The water inlet system further includes a siphon stopper secured to the open second end of the adapter. The siphon stopper includes a disk having a first surface, a second surface and a periphery. The first surface closes off the open second end of the adapter and is positioned above the water line in the aquarium. An attachment member is secured to the second surface of the disk which engages with the open second end of the adapter. A first channel is formed in the disk which connects an interior of the attachment member to the periphery of the disk. A slot is formed in the attachment member that extends into the disk and joins with the first channel. The siphon stopper also includes an elongated member having a first end which is secured to the periphery of the disk. The elongated member also has a second end. A groove is formed in the elongated member that connects the first channel to the second end of the elongated member. A majority of the groove is positioned below the water line in the aquarium. Should the pump fail to supply water to the aquarium, the water line will drop to a horizontal plane even with the second end of the elongated member. At this point, the air that passed through the first channel and into the adapter will reach the first end of the adapter and break any back siphon that may have developed in the water inlet system.

This invention also relates to a siphon stopper for an aquarium. The aquarium has a water line and a water inlet system for supplying water to the aquarium. The water inlet system further includes an adapter having an open end. The siphon stopper includes a disk having a first surface, a second surface and a periphery. The first surface closes off the open end of the adapter and is positioned above the water line. The siphon stopper also includes an attachment member secured to the second surface of the disk which engages with the open end of the adapter. A first channel is formed in the disk which connects an interior of the attachment member to the periphery of the disk. A slot is formed in the attachment member that extends into the disk and joins with the first channel. The siphon stopper further includes a first elongated member having a first end secured to the periphery of the disk. The elongated member also includes a second end. A groove is formed in the elongated member that connects the first channel to the second end of the elongated member. A majority of the groove is positioned below the water line in the aquarium. Should the water inlet system fail to supply water to the aquarium, the water line will drop to a horizontal plane even with the second end of the elongated member. At this point, the air that passed through the first channel and into the adapter will reach the first end of the adapter and break any back siphon that may have developed in the water inlet system.

This invention further relates to a method of attaching a water inlet system to an aquarium. The aquarium has a sidewall and a water line. The method includes the steps of forming an aperture through the sidewall of the aquarium. A tubular member is then passed through the aperture. The tubular member has a first end connected to a pump which can supply water from a reservoir to the aquarium, and a second end positioned in the aquarium. The method also includes securing a first end of an adapter to the second end of the tubular member. The adapter has an open second end, and an open third end positioned below the second end. A first end of a spout is secured to the open third end of the adapter. The spout has a second end through which water can be discharged into the aquarium. The spout is maneuverable to alter the direction at which the water can be discharged into the aquarium. The method further includes securing a siphon stopper to the open second end of the adapter. The siphon stopper includes a disk having a first surface, a second surface and a periphery. The first surface closes off the open second end of the adapter and is positioned above the water line in the aquarium. The siphon stopper also includes an attachment member secured to the second surface of the disk which engages with the open second end of the adapter. A first channel is formed in the disk which connects an interior of the attachment member to the periphery of the disk. A slot is formed in the attachment member that extends into the disk and joins with the first channel. The siphon stopper further includes an elongated member having a first end secured to the periphery of the disk and a second end. A groove is formed in the elongated member that connects the first channel to the second end of the elongated member. A majority of the groove is positioned below the water line in the aquarium. Should the water inlet system fail to supply water to the aquarium, the water line will drop to a horizontal plane even with the second end of the elongated member. At this point, the air that passed through the first channel and into the adapter will reach the first and of the adapter and break any back siphon that may have developed in the water inlet system.

The general object of this invention is to provide a water inlet system for an aquarium, a siphon stopper and a method of attaching the system to an aquarium. A more specific object of this invention is to provide a water inlet system for an aquarium which does not utilize a one-way check valve.

Another object of this invention is to provide a water inlet system for an aquarium which includes a siphon stopper having a low profile that can be positioned above the water line in the aquarium but below the lid of the aquarium.

A further object of this invention is to provide a water inlet system for an aquarium which is relatively inexpensive.

Still another object of this invention is to provide a water inlet system for an aquarium which is easy to attach to an aquarium.

Still further, an object of this invention is to provide a water inlet system for an aquarium which can be formed from plastic so that it will not rust or corrode.

Other objects and advantages of the present invention will become more apparent to those skilled in the art in view of the following description and the accompanying drawings.

DETAILED DESCRIPTION OF THE INVENTION

Figure 1:
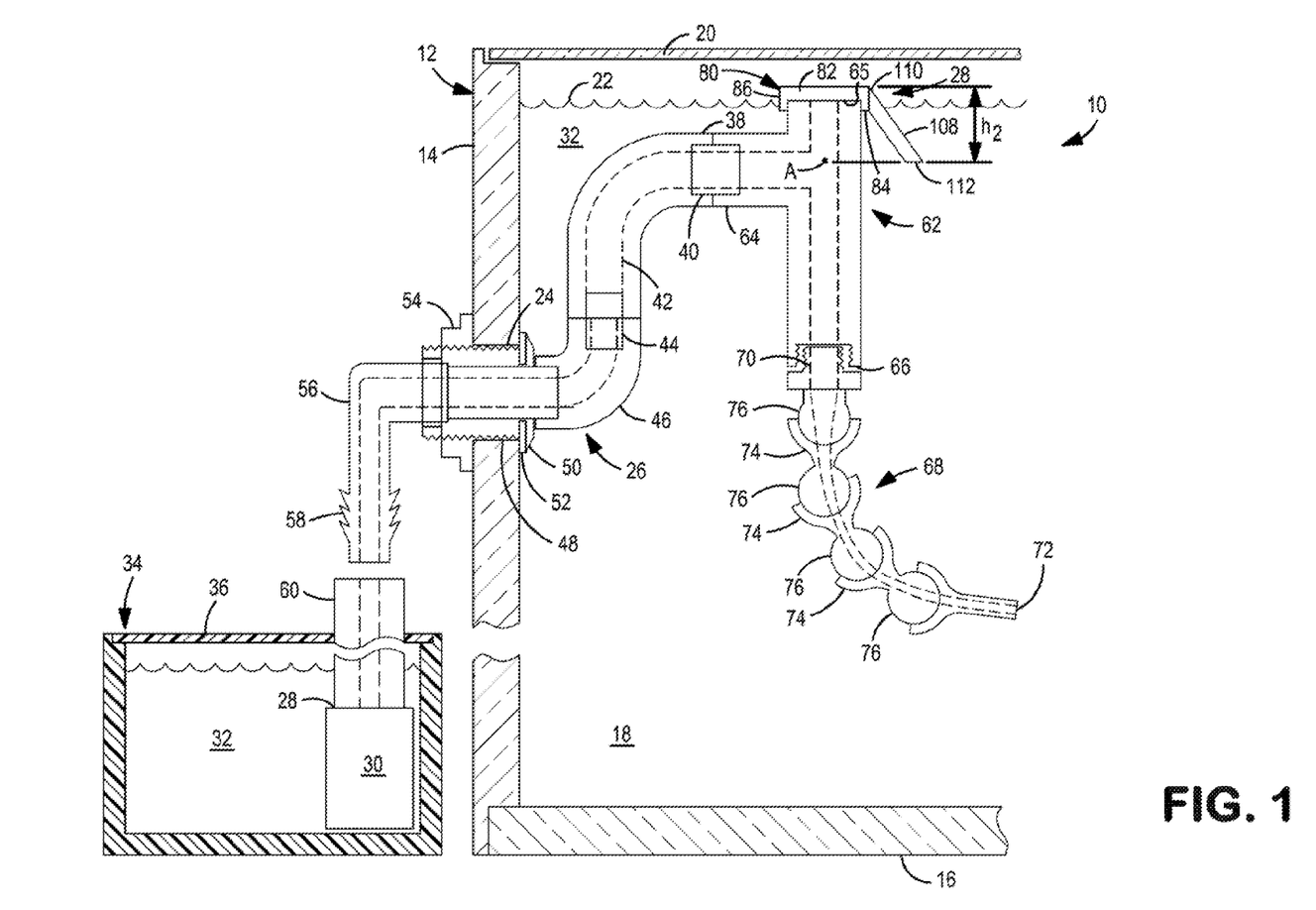
FIG. 1 is a cross-sectional view of a water inlet system secured to the sidewall of an aquarium.
Figure 2:
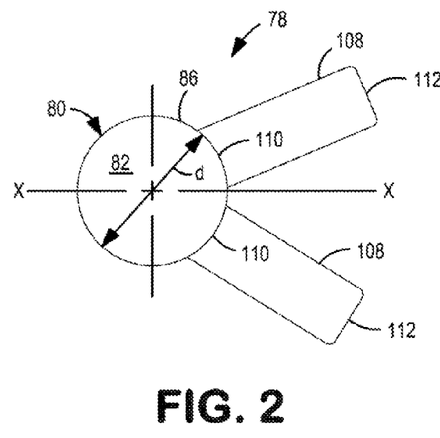
FIG. 2 is a top view of a siphon stopper.

Referring to FIG. 1, a water inlet system 10 for an aquarium 12 is shown. By "aquarium" it is meant a water filled enclosure in which living fish or other aquatic animals and plants are kept. The aquarium 12 has a sidewall 14 joined to and extending upward from a bottom wall 16 to form an enclosure 18. Depending on the configuration of the aquarium 12, it can have a single sidewall 14 which is joined to the bottom wall 16 to form an enclosure 18 having a circular or cylindrical shape. Alternatively, the aquarium 12 can have two or more sidewalls 14, 14 joined to the bottom wall 16 and to one another to form an enclosure 18 having an oval cross-sectional shape. Three sidewalls 14, 14 and 14 can be arranged and joined together to form an enclosure 18 having a triangular shape. Four sidewalls 14, 14, 14 and 14 can be arranged and joined together to form an enclosure 18 having a square or rectangular cross-sectional shape, etc. The aquarium 12 can hold either fresh water or salt water. The aquarium 12 can vary in size. For example, the aquarium 12 can hold anywhere from between 10 gallons of water to 1,500 gallons of water or more. The aquarium 12 can be constructed out of various materials. Glass, tempered glass and acrylic are the most common materials from which the aquarium 12 is constructed.

Although the invention will be explained as a water inlet system 10 for an aquarium 12, the aquarium 12 could be any type of container capable of holding a large quantity of fluid. The container could be used in various commercial, industrial, municipal and/or residential applications and processes. The container could hold any kind of fluid. The fluid can vary and can be almost any liquid or gas. By "fluid" it is meant a continuous amorphous substance whose molecules move freely past one another and that assumes the shape of its container; a liquid or a gas. The fluid can be but is not limited to: fresh water, salt water, brine, an aqueous mixture, a chemical, a food mixture, a liquid mixture, a gas, milk, a juice, a soft drink, an alcohol, etc. By "brine" it is meant water saturated with or containing large amounts of a salt, especially sodium chloride; the water of a sea or an ocean. For simplicity, the invention will be explained in reference to an aquarium 12.

The aquarium 12 can be supported by a stand or be mounted on top of a cabinet having one or more doors. The cabinet can contain and hide from view a filtering system used to keep the water in the aquarium 12 clean. Many home aquariums 12 are located in a room or foyer where they are prominently displayed. Many such areas are carpeted or contain finished hardwood floors. In addition, fine furniture is usually positioned adjacent to such aquariums 12. Because of such locations, floods are frowned upon since overflowed water from the aquarium 12 can stain or ruin the surrounding furnishings.

Still referring to FIG. 1, a removable lid 20 is placed across the open top of the aquarium 12. The lid 20 is supported by the one or more sidewalls 14, 14. The lid 20 functions to slow down, limit or prevent evaporation of the water from the aquarium 12. The lid 20 can be formed from various materials. For example, the lid 20 can be a piece of glass, a piece of Plexiglas®, a piece of plastic, etc. Plexiglas® is a registered trademark of Rohm and Haas Company having an office at Independence Mall, West Philadelphia, Pa. 19105 and is used to denote a light transparent weather-resistant thermoplastic.

The aquarium 12 is filled with a quantity of water which establishes a water line 22. The water line 22 should be located near the top of the aquarium 12. Sometimes, the aquarium 12 can contain a wooden canopy or frame (not shown) which will hide the water line 22 from the view of a person looking at the aquatic life in the aquarium 12.

The water inlet system 10 includes an aperture 24 formed through the sidewall 14 of the aquarium 12. The remainder of the water inlet system 10 can be formed from various materials including but not limited to: a plastic, a thermoplastic, a composite material, or any other material known to those skilled in the art which can be fabricated or molded. Many of the components of the water inlet system 10 can be constructed of polyvinyl chloride (PVC). The gaskets, washers and any other seals used in the water inlet system 10 should be formed from a soft and pliable material, such as rubber. Desirably, the water inlet system 10 is formed primarily from plastic.

The water inlet system 10 includes a tubular member 26 which passes through the aperture 24. By "tubular" it is meant a hollow cylinder especially one that conveys a fluid or functions as a passage. The tubular member 26 has a first end 28 connected to a pump 30. The pump 30 is designed to supply water 32 from a reservoir 34 to the aquarium 12. The pump 30 can vary in design and construction. Many different kinds of pumps 30 are commercially available. The pump 30 can be positioned in the reservoir 34, if desired. The pump will pump the water 32 under pressure through the tubular member 26. The reservoir 34 can be a large holding tank or vessel that can vary in size, shape, configuration and construction. The reservoir 34 should be able to hold a sufficient supply of water 32 but usually much less than the amount of water 32 held by the aquarium 12. The reservoir 34 can have an open or closed top. By placing a removable lid 36 over the opening present in the top of the reservoir 34, one can slow down, limit or prevent evaporation of the water 32 from the reservoir 34.

The tubular member 26 also has a second end 38 positioned in the aquarium 12. It should be noted that the tubular member 26 can include a variety of components used to secure it to the sidewall 14 of the aquarium 12. The tubular member 26 needs to be position at a correct height and orientation in the aquarium 12. The tubular member 26 also needs to be properly connected to the reservoir 34. By way of example only, the tubular member 26 is shown including: a first tubular insert 40, a first elbow 42, a second tubular insert 44, a second elbow 46, a threaded collar 48 with an enlarged shoulder 50, a soft gasket or washer 52, a nut 54 which is sized to thread onto the threaded collar and secure the tubular member 26 to the sidewall 14. The tubular member 26 can further include a third elbow 56. The third elbow 54 can have a quick attachment mechanism 58 formed on an end thereof to which a hose 60 can be connected. The opposite end of the hose 60 can be secured to the pump 30.

It should be understood that the first, second and third elbows, 42, 46 and 56 respectively, can vary in angular configuration. The first, second and third elbows, 42, 46 and 56 respectively, are all shown as being 90° elbows. However, one or more of the elbows 42, 46 or 56 can be at a different angle. The angle can vary from between about 5° to about 90°. Elbows at 45°, 60°, 75° or 90° are commercially available. However, one could construct an elbow 42, 46 or 56 to any desired configuration.

Still referring to FIG. 1, the water inlet system 10 also includes an adapter 62. The adapter 62 can vary in size, shape and configuration. The adapter 62 is shown as being T-shaped, although other shapes could also be utilized. The adapter 62 has a first end 64, a second end 65 and a third end 66. The first end 64 is positioned between the second end 65 and the third end 66. The first end of the adapter 62 is secured to the second end 38 of the tubular member 26. The second and third ends, 65 and 66 respectively, of the adapter 62 are initially open. In addition, the second end 65 is positioned above the third end 66. Desirably, the second end 65 is vertically aligned with the third end 66. In FIG. 1, the third end 66 is positioned below the second end 65 and is spaced apart therefrom.

The water inlet system 10 further includes a spout 68. By "spout" it is meant a tube, mouth or pipe through which liquid is released or discharged. The spout 68 has a first end 70 secured to the open third end 66 of the adapter 66. The spout 68 also has a second end 72 through which the water 32 can be discharged into the aquarium 12. The spout 68 should be maneuverable so as to change or alter the direction, angle and/or location at which the water 32 is discharged into the aquarium 12. The specific configuration and construction of the spout 68 can vary. In FIG. 1, the spout 68 is shown as containing a plurality of interconnected knuckles 74. Each knuckle 74 is movably connected to another knuckle 74. Each of the knuckles 74 is capable of rotating or pivoting on a ball shaped end 76. By "knuckle" it is meant a rounded protuberance formed in a joint. The plurality of interconnected knuckles 74 permit the direction of the spout 68 to be changed or altered so that the water 32 discharge from the second end 72 of the spout 68 can vary. By adjusting the angle, direction and/or orientation of the spout 68, one can better control surface circulation of the water 32 and aeration in the aquarium 12. The spout 68 should be capable of being maneuvered through an angle of at least about 90°.

It should be understood that the spout 68 could be constructed and shaped in other ways and still be able to be maneuverable so as to change or alter the direction, angle and/or location at which the water 32 is discharged into the aquarium 12. Those skilled in the art are well aware of alternative embodiments for forming the spout 68, Referring now to FIGS. 1-7, the water inlet system 10 further includes a siphon stopper 78. The siphon stopper 78 is secured to the open second end 65 of the adapter 62. The siphon stopper 78 has a longitudinal central axis X-X, a vertical central axis Y-Y, and a transverse central axis Z-Z. The siphon stopper 78 can be formed from various materials including but not limited to: a plastic, a thermoplastic, a composite material, or any other material known to those skilled in the art which can be fabricated or molded. Desirably, the siphon stopper 78 is formed from plastic. The siphon stopper 78 can be injection molded. The siphon stopper 78 includes a disk 80 having a first surface 82, a second surface 84 and a periphery 86. By "disk" it is meant a thin, flat, circular object or plate. The disk 80 has a diameter d and a thickness t, see FIG. 4. The diameter d of the disk 80 can vary. Desirably, the diameter d of the disk 80 is about 1.5 inches or less. More desirably, the diameter d of the disk 80 is about 1.25 inches or less. The thickness t of the disk 80 can also vary. The thickness t of the disk 80 is measured along the transverse central axis Z-Z can vary. The thickness t of the disk 80 can range from between about 0.15 inches to about 0.25 inches. Desirably, the thickness t of the disk 80 is about 0.2 inches. The first surface 82 of the disk 80 closes off the open second end 64 of the adapter 62. The first surface 82 of the disk 80 is positioned above the water line 22 in the aquarium 12.

Figure 3:
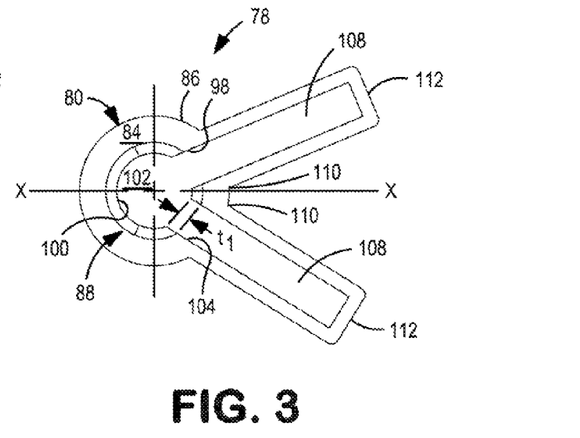
FIG. 3 is a bottom view of the siphon stopper shown in FIG. 2.
Figure 4:
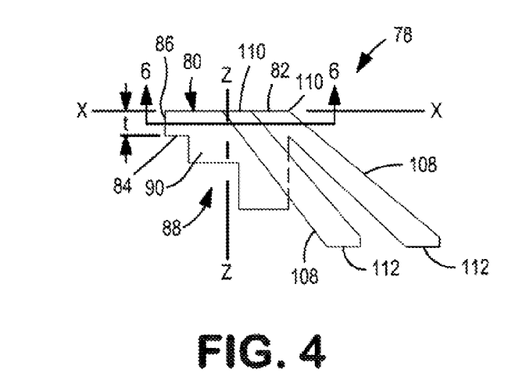
FIG. 4 is a side view of the siphon stopper shown in FIG. 2.
Figure 5:
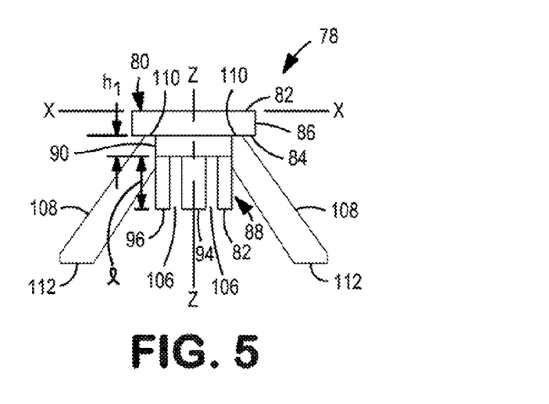
FIG. 5 is a side view f the siphon stopper shown in FIG. 2 rotated 90° to the right.

Referring now to FIGS. 3-5, an attachment member 88 is secured to the second surface 84 of the disk 80. The attachment member 88 can vary in size, design and configuration. The attachment member 88 is designed to engage with the open second end 64 of the adapter 62 and hold the siphon stopper 78 in place. The attachment member 88 can be maneuvered so that the siphon stopper 78 can be set at a predetermined orientation within the open second end 64 of the adapter 62. An adhesive (not shown) can also be used to form a more secure connection between the attachment member 88 and the open second end 64 of the adapter 62. Desirably, the attachment member 88 is secured in place once proper orientation has been decided upon.

The attachment member 88 includes a collar 90. By "collar" it is meant an encircling structure or band like member. The collar 90 spans 360°. The collar 90 also has a height h that can vary in dimension. Desirably, the height h of the collar 90 can range from between about 0.05 inches to about 0.25 inches. More desirably, the height h of the collar 90 is about 0.2 inches. Extending downward from the collar 90 are at least two or more arc shaped segments 92 and 94. Three arc shaped segments 92, 94 and 96 are shown in FIG. 5. Each of the arc shaped segments 92, 94 and 96 can span the same number of degrees or a different number of degrees. The greater the arc formed by each of the three arc shaped segments, 92, 94 and 96, the better the attachment with the open second end 64 of the adapter 62. The length of the arc of each of the arc shaped segment 92, 94 and 96 can be the same or can vary. Desirably, the length of the arc of the arc shaped segment 92 will be equal to the length of the arc of the arc shaped segment 96. The length of the arc of the arc shaped segment 94 can be less than, equal to or be greater than the length of the arc of each of the arc shaped segments 92 and 96. Desirably, the length of the arc of the arc shaped segment 94 is less than the length of the arc of each of the arc shaped segments 92 and 96. The two or more arc shaped segments 92, 94 and 96 function to form a tight or snug fit in the open second end 64 of the adapter 62.

Still referring to FIG. 5, each of the arc shaped segments 92, 94 and 96 has a length l measured along the transverse central axis Z-Z. The length l can vary in dimension. Desirably, the length l of all three arc shaped segments 92, 94 and 96 is the same. Alternatively, the length l of each of the arc shaped segments 92, 94 and 96 can be different such that one or more of the arc shaped segments 92, 94 and 96 has a different length l. The length l of each of the arc shaped segments 92, 94 and 96 can range from between about 0.3 inches to about 0.5 inches. Desirably, the length l of each of the arc shaped segments 92, 94 and 96 is about 0.4 inches.

Referring again to FIGS. 3, 5 and 6, the siphon stopper 78 also includes a first channel 98 formed in the disk 80 which connects an interior 100 of the attachment member 88 to the periphery 86 of the disk 80. The first channel 98 is aligned parallel to the second surface 84. The first channel 98 extends radially outward from the center of the siphon stopper 78. The first channel 98 can vary in dimensions. Typically, the first channel 98 has a length $l_1$, a width $w_1$ and a height $h_1$, see FIGS. 5 and 6. The length $l_1$ of the first channel 98 can vary. The length $l_1$ of the first channel 98 can range between about 0.15 inches to about 0.4 inches. Desirably, the length $l_1$ of the first channel 98 is about 0.25 inches. The width $w_1$ of the first channel 98 can also vary. The width $w_1$ of the first channel 98 can range between about 0.05 inches to about 0.2 inches. Desirably, the width $w_1$ of the first channel 98 is about 0.1 inches. The height $h_1$ of the first channel 98 can also vary. The height $h_1$ of the first channel 98 can range between about 0.05 inches to about 0.15 inches. Desirably, the height $h_1$ of the first channel 98 is about 0.1 inches.

Figure 6:
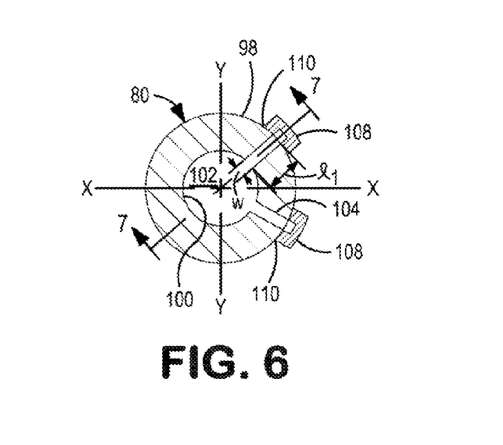
FIG. 6 is a cross-sectional view of the siphon stopper shown in FIG. 4 taken along line 6-6.

The height $h_1$ of the first channel 98 should be at least about 25% of the thickness t of the disk 80. Desirably, the height $h_1$ of the first channel 98 is at least about 40% of the thickness t of the disk 80. More desirably, the height $h_1$ of the first channel 98 is at least about 45% of the thickness t of the disk 80. Even more desirably, the height $h_1$ of the first channel 98 is at least about 50% of the thickness t of the disk 80.

Referring again to FIGS. 3, 6 and 7, the second surface 84 of the disk 80 has a depression 102 formed therein. By "depression" it is meant an area that is sunk below its surroundings; a hollow. The first channel 98 and an interior 100 of the attachment member 88 connect to the depression 102. The depression 102 serves as an area where the first channel 98 can intersect with the interior 100 of the attachment member 88. The size, shape and configuration of the depression 102 can vary. The important feature of the depression 102 is that it enables a liquid, such as water, or air to freely flow from the interior 100 of the attachment member 88 into the first channel 98 or vice versa.

Figure 7:
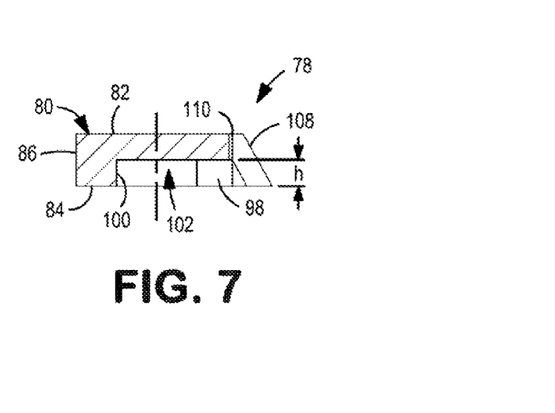
FIG. 7 is a cross-sectional view of the siphon stopper shown in FIG. 6 taken along line 7-7.

It should be understood that the above described dimensions for the first channel 98 form either a square or rectangular shaped first channel 98. However, the first channel 98 could have some other shape, such as a semi-circular shape, if desired.

Still referring to FIGS. 3 and 6, the siphon stopper 78 is shown having a second channel 104. The second channel 104 is optional. The second channel 104 is formed in the disk 80 and connects the interior 100 of the attachment member 88 to the periphery 86 of the disk 80. The second channel 104 can be identical in size, shape and configuration to the first channel 98. Alternatively, the second channel 104 can be constructed to be different in size, shape and configuration from the first channel 98, if desired. Desirably, the first and second channels, 98 and 104 respectively, are identical. The second channel 104 is offset from the first channel 98. The second channel 104 can be offset from the first channel 98 by any number of degrees. The second channel 104 can be offset from the first channel 98 from between about 10° to about 180°. Desirably, the second channel 104 is offset from the first channel 98 by at least about 90°. More desirably, the second channel 104 is offset from the first channel 98 by at least about 45°. Even more desirably, the second channel 104 is offset from the first channel 98 by at least about 15°. The second channel 104 serves the same function as the first channel 98. However, should one of the first or second channels, 98 and 104 respectively, become blocked, the siphon stopper 78 will still be able to function properly.

Referring again to FIG. 5, the siphon stopper 78 also includes at least one slot 106 formed in the attachment member 88 which extends into the depression 102 formed in the disk 80. Two slots 106, 106 are shown in FIG. 5. The second slot 106 is optional. Each of the slots 106, 106 is vertically aligned with and joins to one of the first and second channels, 98 and 104 respectively. The size, shape and configuration of each of the slots 106, 106 can vary. Desirably, each of the slots 106, 106 will correspond in size, shape and configuration to that of the first and second channels, 98 and 104 respectively. Desirably, the top of each of the slots 106, 106 is aligned flush with the top of the first and second channels, 98 and 104 respectively. Each of the slots 106, 106 are in fluid communication with the interior 100 of the attachment member 88 and with the depression 102.

Referring again to FIG. 3, the attachment member 88 has a thickness $t_1$ and each of the slots 106, 106 is formed across this thickness $t_1$.

Referring now to FIGS. 1-5, the siphon stopper 78 further includes at least one elongated member 108. Two elongated members 108, 108 are shown in the figures. The second elongated member 108 is optional. Each of the elongated members 108, 108 has a first end 110 secured to the periphery 86 of the disk 80 and a second end 112 which is spaced apart from the first end 110. A groove 114 is formed in each of the elongated members 108, 108. Each of the grooves 114, 114 can vary in size, shape and configuration. Each of the grooves 114, 114 is linear. Desirably, each of the grooves 114, 114 increases in cross-sectional area from a point where each of the grooves 114, 114 connects with one of the first or second channels, 98 or 104 respectively, to a point where each of the grooves 114, 114 contacts to the second end 112 of one of the elongated members 108, 108. One of the grooves 114, 114 connects the first channel 98 to the second end 112 of one of the elongated members 108, and the other groove 114 connects the second channel 104 to the second end 112 of the other elongated member 108. A majority of each of the grooves 114, 114 is positioned below the water line 22 in the aquarium 12. During normal operation, pressurized water 32 from the pump 30 is supplied to the aquarium 12 via the water inlet system 10. The water 32 passes through the third end 66 of the adapter 62 and flows out through the first end 70 of the spout 68. Simultaneously, two small streams of water 32 will flow through the first and second channels, 98 and 104 respectively, and through the grooves 114, 114 into the aquarium 12. The water line 22 will be aligned approximately with the second surface 84 of the disk 80. This means that the first and second channels, 98 and 104 respectively, and essentially the entire length of each of the grooves 114, 114 will be below the water line 22. The outward force of the exiting water 32 will prevent air from entering the siphon stopper 78.

Referring again to FIG. 1, should the pump 30 fail to supply water 32 to the aquarium 12, for any reason, the water line 22 in the aquarium 12 will drop. The pump 30 can stop working for a number of reasons. The most prevalent problem is a power outage. However, sometimes the pump 30 will mechanically break or the electricity to it is stopped for some reason, such as a broken wire. With the pump 30 stopped, no additional water 32 will flow through the water inlet system 10 and out through the first and second channels, 98 and 104 respectively. In fact, a back siphon usually develops which causes the water 32 in the aquarium 12 to flow backward through the water inlet system 10. This water 32 will return to the reservoir 34. Since the reservoir 34 is usually not large enough to accept a significant quantity of water 32 from the aquarium 12, it will eventually overflow. This means that the water 32 from the reservoir 34 will flow down onto the floor or carpeting and flood the surrounding area. Any furniture or articles in close proximity to the reservoir 34 can become wet. Carpeting that is wetted usually develops water stains which may be difficult or impossible to remove. As the water line 22 continues to drop in the aquarium 12, the water line 22 will reach a horizontally plane which is even with the second ends 112, 112 of the elongated members 108, 108. This means that a point "A", see FIG. 1, located in the water inlet system 10, which is on the same horizontal plane as the second ends 112, 112 of the elongated members 108, 108, will be exposed to the air. This level coincides with the first end 64 of the adapter 62. As soon as the air enters the first end 64 of the adapter 62, any back siphon that developed will be broken and no additional water 32 will be routed back to the reservoir 34.

Referring again to FIG. 1, the siphon stopper 78 has a low profile. This means that it is rather compact and has an overall height $h_2$ that is less than about 1.5 inches. Desirably, the overall height $h_2$ of the siphon stopper 78 is less than about 1.25 inches. The siphon stopper 78 is secured to the water inlet system 10 such that the first surface 82 of the disk 80 is located above the water line 22 in the aquarium 12 but below the lid 36 of the aquarium 12. The lid 36 minimizes evaporation of water in the aquarium 12 from occurring. A limited amount of evaporation may still occur but it is kept to a minimum. Additional water can be added to the aquarium periodically to replenish any water 32 that has been loss due to evaporation.

The siphon stopper 78 can be movably manipulated within the second end 65 of the adapter 62 so as to control circulation of the water 32 in the aquarium 12. Once a suitable orientation has been established, the siphon stopper 78 can be permanently secured by using an adhesive, if needed. The siphon stopper 78 is easy to install. In addition, the siphon stopper 78 is a very reliable device that provides a visually appealing approach to returning water 32 from a filtration unit to the aquarium 12 while protecting one's property from a potential flood should a power outage occur.

The water inlet system 10 is unique in that it does not utilize a check valve. Check valves are prone to failure over time especially when they are situated in a liquid environment. In addition, the water inlet system 10 has a small footprint and therefore when installed is generally out of the line of sight of a person looking at the aquarium 12. This means that there is very little visual impact on the look of the aquatic life in the aquarium 12.

Figure 8:
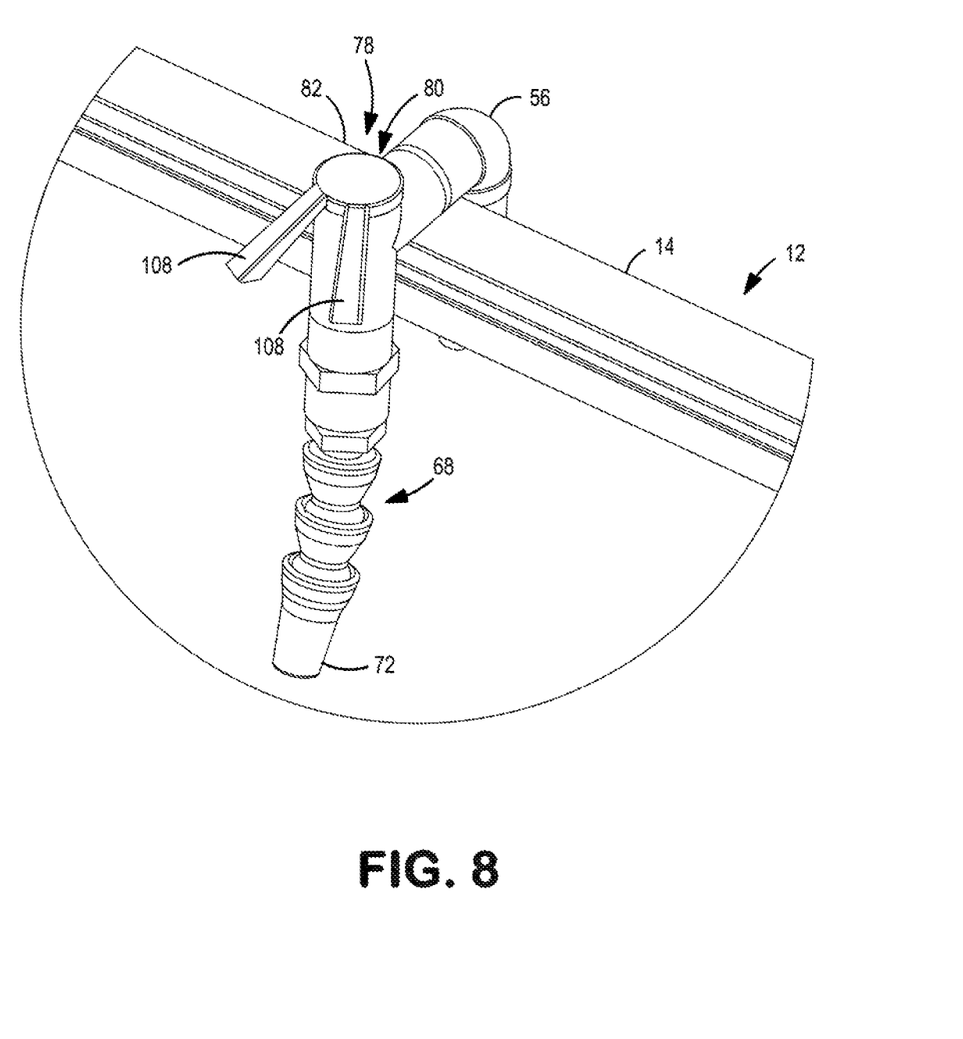
FIG. 8 is a perspective view of the water inlet system positioned over the sidewall of an aquarium.

Referring now to FIG. 8, an alternative embodiment is depicted where the water inlet system 10 is positioned over the sidewall 14 of an aquarium 10. In this embodiment, it is not necessary to drill an aperture 24 through the sidewall 14. However, the bottom ends of the pair of elongated members 108, 108 must be located below the water line 22 in the aquarium 12.

METHOD

A method of attaching a water inlet system 10 to an aquarium 12 will now be explained. The aquarium 12 has a sidewall 14 and a water line 22. The method includes the steps of forming an aperture 24 through the sidewall 14 of the aquarium 12. However, if the water inlet system 10 is positioned over the sidewall 14 of the aquarium, as is shown in FIG. 8, then it is not necessary to drill an aperture 24 through the sidewall 24. A tubular member 26 is then passed through the aperture 24. The tubular member 26 has a first end 28 connected to a pump 30 which can supply water 32 from a reservoir 34 to the aquarium 12. The tubular member 26 also has a second end 38 positioned in the aquarium 12. The second end 38 of the tubular member 26 is secured to the first end 64 of an adapter 62. The adapter 62 also has a second end 65 and a third end 66. The third end 66 is positioned below the second end 65 and both the second and third ends. 65 and 66 respectively are initially open. The first end 70 of a spout 68 is secured to the open third end 66 of the adapter 62. The spout 68 has a second end 72 through which the water 32 can be discharged into the aquarium 12. The spout 68 is maneuverable to change the direction and angle at which the water 32 can be discharged into the aquarium 12. The spout 68 can be maneuvered through an angle of at least about 90°.

The method also includes securing a siphon stopper 78 to the open second end 65 of the adapter 62. The siphon stopper 78 includes a disk 80 having a first surface 82, a second surface 84 and a periphery 86. The first surface 82 closes off the open second end 65 of the adapter 62. The first surface 82 is positioned above the water line 22 in the aquarium 12. An attachment member 88 is secured to the second surface 84 of the disk 80 and engages with the open second end 65 of the adapter 62. A first channel 98 is formed in the disk 80 which connects an interior 100 of the attachment member 88 to the periphery 86 of the disk 80. A slot 106 is formed in the attachment member 88. The sot 106 extends into the disk 80 and joins with the first channel 98. The siphon stopper 78 further includes an elongated member 108 having a first end 110 which is secured to the periphery 86 of the disk 80 and a second, spaced apart end 112. A groove 114 is formed in the elongated member 108. The groove 114 connects the first channel 98 to the second end 112 of the elongated member 108. A majority of the groove 114 is positioned below the water line 22 in the aquarium 12. Should the pump 30 fail to supply water 32 to the aquarium 12, for any reason, the water line 22 will drop to a horizontal plane even with the second end 112 of the elongated member 108. At this point, the air that passed through the first channel 98 and into the adapter 62 will reach the first end 64 of the adapter 62 (point "A", see FIG. 1) and break any back siphon that may have developed in the water inlet system 10.

The method also includes forming a second channel 104 in the disk 80 which connects the interior 100 of the attachment member 88 to the periphery 86 of the disk 80. The second channel 104 can be identical to the first channel 98. The second channel 104 is offset from the first channel 98. The second channel 104 can be offset from the first channel 98 from between about 10° to about 180°. Desirably, the second channel 104 is offset from the first channel 98 by less than about 90°. More desirably, the second channel 104 is offset from the first channel 98 by less than about 45°. Even more desirably, the second channel 104 is offset from the first channel 98 by less than about 30°. Most desirably, the second channel 104 is offset from the first channel 98 by at least about 15°. A second elongated member 108 is aligned with the second channel 104. The second elongated member 108 can be identical to the first elongated member 108. The second elongated member 108 has a first end 110 secured to the periphery 86 of the disk 80. The second elongated member 108 also has a second end 1112 spaced apart from its first end 110. A groove 114 is formed in the second elongated member 108. The groove 114 connects the second channel 104 to the second end 112 of the second elongated member 108.

The method can further include securing at least one elbow 42 between the second end 38 of the tubular member 26 and the adapter 62. The elbow 42 is located within the aquarium 12.

Many of the components of the water inlet system 10 can be formed by injection molding. In particular, the siphon stopper 78 can be easily formed by injection molding.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A siphon stopper for an aquarium, said aquarium having a water line and a water inlet system for supplying water to said aquarium, said water inlet system including an adapter having an open end, comprising:
   a) a disk having a first surface, a second surface and a periphery, said first surface closing off said open end of said adapter, and said first surface being positioned above said water line;
   b) an attachment member secured to said second surface of said disk which engages with said open end of said adapter;
   c) a first channel formed in said disk which connects an interior of said attachment member to said periphery of said disk;
   d) a slot formed in said attachment member which extends into said disk and joins with said first channel;
   e) a first elongated member having a first end secured to said periphery of said disk and a second end; and
   f) a groove is formed in said elongated member which connects said first channel to said second end of said elongated member, a majority of said groove being positioned below said water line in said aquarium, whereby should said water inlet system fail to supply water to said aquarium, said water line will drop to a horizontal plane even with said second end of said elongated member and, at this point, air that passed through said first channel and into said adapter will reach said first end of said adapter and break any back siphon that may have developed in said water inlet system.

2. The siphon stopper of claim 1 wherein said disk has a thickness measured between said first and second surfaces, and said first channel has a height which is at least about 25% of said thickness of said disk.

3. The siphon stopper of claim 2 wherein said first channel has a height which is at least about 45% of said thickness of said disk.

4. The siphon stopper of claim 1 wherein said siphon stopper is formed from plastic.

5. The siphon stopper of claim 1 wherein said attachment member has a thickness and said slot is formed across said thickness.

6. The siphon stopper of claim 1 wherein a depression is formed in said second surface of said disk, and said first channel and an interior of said attachment member connect to said depression.

7. The siphon stopper of claim 1 further comprising a second channel formed in said disk which connects an interior of said attachment member to said periphery of said disk, said second channel being offset from said first channel, a second elongated member having a first end secured to said periphery of said disk and a second end, and a groove formed in said second elongated member which connects said second channel to said second end of said second elongated member.

8. The siphon stopper of claim 7 wherein said second channel is offset from said first channel by at least about 15°.

9. The siphon stopper of claim 1 wherein said groove increases in cross-sectional area from a point where said groove connects to said first channel to a point where said groove contacts said second end of said elongated member.

10. A water inlet system for an aquarium, said aquarium having a sidewall and a water line, comprising:
   a) an aperture formed through said sidewall of said aquarium;

b) a tubular member passing through said aperture, said tubular member having a first end connected to a pump which can supply water from a reservoir to said aquarium, and a second end positioned in said aquarium;

c) an adapter having a first end secured to said second end of said tubular member, an open second end, and an open third end positioned below said second end;

d) a spout having a first end secured to said open third end of said adapter and a second end through which water can be discharged into said aquarium, said spout being maneuverable to alter the direction at which said water is discharged; and e) a siphon stopper secured to said open second end of said adapter, said siphon stopper including a disk having a first surface, a second surface and a periphery, said first surface closing off an open second end of an adapter and positioned above said water line in said aquarium, an attachment member secured to said second surface of said disk which engages with said open second end of said adapter, a first channel formed in said disk which connects an interior of said attachment member to said periphery of said disk, a slot formed in said attachment member which extends into said disk and joins with said first channel, an elongated member having a first end secured to said periphery of said disk and a second end, and a groove formed in said elongated member which connects said first channel to said second end of said elongated member, a majority of said groove being positioned below said water line in said aquarium, and should said pump fail to supply water to said aquarium, said water line will drop to a horizontal plane even with said second end of said elongated member and, at this point, air that passed through said first channel and into said adapter will reach said first end of said adapter and break any back siphon that may have developed in said water inlet system.

11. The water inlet system of claim 10 wherein said adapter is a T-shaped adapter with said first end positioned between said second and third ends, and said second end is positioned above said third end.

12. The water inlet system of claim 10 further comprising a second channel formed in said disk which connects an interior of said attachment member to said periphery of said disk, said second channel being offset from said first channel, a second elongated member having a first end secured to said periphery of said disk and a second end, and a groove formed in said second elongated member which connects said second channel to said second end of said second elongated member.

13. The water inlet system of claim 12 wherein said second channel is offset from said first channel from between about 10° to about 180°.

14. The water inlet system of claim 13 wherein said second channel is offset from said first channel by less than about 90°.

15. The water inlet system of claim 14 wherein said second channel is offset from said first channel by less than about 45°.

16. A method of attaching a water inlet system to an aquarium, said aquarium having a sidewall and a water line, said method comprising the steps of:

a) forming an aperture through said sidewall of said aquarium;

b) passing a tubular member through said aperture, said tubular member having a first end connected to a pump which can supply water from a reservoir to said aquarium, and a second end positioned in said aquarium;

c) securing a first end of an adapter to said second end of said tubular member, said adapter having an open second end, and an open third end positioned below said second end;

d) securing a first end of a spout to said open third end of said adapter, said spout having a second end through which water can be discharged into said aquarium, said spout being maneuverable to alter the direction at which said water can be discharged; and e) securing a siphon stopper to said open second end of said adapter, said siphon stopper including a disk having a first surface, a second surface and a periphery, said first surface closing off said open second end of said adapter and being positioned above said water line in said aquarium, an attachment member secured to said second surface of said disk which engages with said open second end of said adapter, a first channel formed in said disk which connects an interior of said attachment member to said periphery of said disk, a slot formed in said attachment member which extends into said disk and joins with said first channel, an elongated member having a first end secured to said periphery of said disk and a second end, and a groove formed in said elongated member which connects said first channel to said second end of said elongated member, a majority of said groove being positioned below said water line in said aquarium, whereby should said pump fail to supply water to said aquarium, said water line will drop to a horizontal plane even with said second end of said elongated member and, at this point, the air that passed through said first channel and into said adapter will reach said first end of said adapter and break any back siphon that may have developed in said water inlet system.

17. The method of claim 16 further comprising forming a second channel in said disk which connects an interior of said attachment member to said periphery of said disk, said second channel being offset from said first channel, a second elongated member having a first end secured to said periphery of said disk and a second end, and a groove formed in said second elongated member which connects said second channel to said second end of said second elongated member.

18. The method of claim 16 further comprising securing at least one elbow between said second end of said tubular member and said adapter, said elbow being located within said aquarium.

19. The method of claim 16 wherein said spout can maneuver through an angle of at least about 90°.

20. The method of claim 16 further comprising injection molding said siphon stopper.

* * * * *